Patented July 11, 1933

1,917,539

UNITED STATES PATENT OFFICE

GEORGE W. MILES, OF BOSTON, MASSACHUSETTS, ASSIGNOR TO CELANESE CORPORATION OF AMERICA, A CORPORATION OF DELAWARE

CONVERSION OF CELLULOSE

No Drawing. Application filed January 15, 1930. Serial No. 421,054.

This invention relates to the conversion of cellulose into simpler or degraded compounds, and relates more particularly to the method of recovering the reagents employed in such conversion in an economical manner.

An object of my invention is to convert cellulose into a simpler compound in an economical manner. A further object of my invention is to provide a method of recovering the sulfuric acid or similar converting agent cheaply. Further objects of my invention will appear from the following detailed description.

In the conversion of cellulose into simpler or degraded compounds such as starches, sugars and the like, in order to obtain large yields of such products, it is necessary to employ large amounts of sulfuric acid as a converting agent. Subsequently this sulfuric acid must be removed, and heretofore this has been done by neutralizing the same with a base. Salts of sulfuric acid thus formed are of little or no commercial value, and therefore the cost of sulfuric acid necessary for the conversion is in many cases prohibitive.

I have found that the sulfuric acid may be readily separated and recovered from the reaction mass formed by the action of sulfuric acid on cellulose by adding thereto an organic liquid that is miscible with the sulfuric acid and which forms a solution with the same in which the conversion products are not soluble.

In accordance with my invention I prepare simpler compounds from a cellulosic material by treating the same with concentrated sulfuric acid or similar converting agents and then adding thereto an organic liquid that is miscible with the sulfuric acid and which causes separation or precipitation of the converted product. The converted product is separated by any suitable economical means for instance such as filtration or centrifuging, and may be put to any desired use. The solution of the sulfuric acid and the organic liquid may then be treated to remove or recover the sulfuric acid which may be reused.

Any suitable cellulosic material may be employed in this process, and is preferably in dry condition. It may be in the form of wood, sawdust, straw, grasses, wood pulp made by any process such as the sulphite, the sulphate, or the soda process, cotton, cotton linters, etc.

The cellulosic material may be treated with the concentrated sulfuric acid at any suitable temperatures, which may vary from freezing temperatures (0°) to room temperatures or to elevated temperatures. However, the temperatures employed are preferably below 5° C., the temperature in all cases being preferably below those at which charring of the cellulose takes place. The amount of sulfuric acid employed may be such to obtain the desired degree of conversion and is generally more than the weight of the cellulose. The sulfuric acid has preferably a concentration of at least 90% and ordinary concentrated sulfuric of 95% concentration is preferred. The time of treatment may be less than 20 minutes or more until the required conversion is attained.

In order to remove the sulfuric acid from the conversion product, an organic liquid that is miscible with the sulfuric acid and which causes precipitation or separation of the converted product is added. While I prefer ether as the extracting agent, other materials such as ethyl or methyl alcohol may be employed, but less preferably, since the separation of the sulfuric acid from the alcohol is more difficult. The organic liquid employed is preferably of relatively low boiling point in order to facilitate the separation from the sulfuric acid by distillation. However, medium or high boiling organic liquids may be employed for separating the sulfuric acid, in which case the same may be extracted from the sulfuric acid in any desired manner.

In one form of my invention, the precipitating liquid, such as ether, may be added directly to the sulfuric acid and the mixture thus formed added to the cellulose to be converted. In this case the cellulose becomes converted after which the ether is removed. In this way, it is possible to employ smaller quantities of sulfuric acid.

After the conversion products are separated from the solution of the sulfuric acid and ether, the same may be employed in any desired manner. Thus they may be hydrolyzed by heating with water, to which some acid may or may not be added, at elevated temperatures, and the sugars thus formed may be fermented in any desired manner to form alcohol or other fermentation products. In some cases the separated conversion product may be fermented as such or may be used for any desired purpose.

The solution of the sulfuric acid and the organic liquid that is separated from the conversion products may be distilled and the volatile ether condensed thus leaving the sulfuric acid as a residue. Alternatively the sulfuric acid may be separated from the organic liquid by the addition of a liquid that is miscible with one component and not with the other. Thus in the case of a mixture of sulfuric acid and ether, naphtha or other petroleum hydrocarbon which is miscible with the ether may be added to form a solution with the ether that separates from the sulfuric acid; or else water may be added to the sulfuric acid to form an aqueous solution that separates from the ether. After separation of the layers, the constituents may be separated by distillation, evaporation or in any other suitable manner. Both the sulfuric acid and the ether may be used again in the treatment of further quantities of cellulosic material.

In order further to illustrate my invention, but without being limited thereto the following specific example is given.

*Example*

10 parts by weight of cellulose in the form of cotton linters, wood pulp and the like are treated with 50 parts by weight of ordinary concentrated sulfuric acid (sp. g. 1.84). The temperature employed may be from freezing temperatures (0° C.) to room temperatures, but preferably below 5° C. After permitting the reaction to proceed until the cellulose is dissolved or converted, which may require 20 minutes or more say 45 minutes, a sufficient quantity of ethyl ether $(C_2H_5)_2O$ to cause precipitation of the conversion product is added. Usually about 50 parts by weight of ether is required for this purpose. The precipitate is removed by filtration or by any suitable means and washed with ether. The conversion products thus recovered and which are soluble in water, may be worked up in any suitable manner. Thus they may be hydrolyzed by heating with water to which some acid may be added if desired to form sugars, which in turn may be converted to ethyl alcohol or other products by fermentation.

The mixture or solution of ether and sulfuric acid that is separated from the conversion products is subjected to distillation to remove the ether, which is condensed, while the sulfuric acid remains as a residue. The ether and the sulfuric acid thus recovered are employed in the treatment of a further batch of cellulosic material. The sulfuric acid and the ether may be separated in any other manner, as described above.

It is to be understood that the foregoing detailed description is merely given by way of illustration and that many variations may be made therein without departing from the spirit of this invention.

Having described my invention, what I claim and desire to secure by Letters Patent is:

1. In the method of converting cellulose into simpler compounds by the action of an acid, the step of separating the reaction product by means of an organic liquid that forms a solution with the acid in which solution the reaction product is insoluble.

2. In the method of converting cellulose into simpler compounds by the action of sulfuric acid, the step of separating the conversion products by means of an organic liquid that forms a solution with the sulfuric acid in which solution the conversion product is insoluble.

3. The method of forming simpler compounds from cellulose comprising treating cellulose with concentrated sulfuric acid, adding ether to the reaction product whereby the conversion product of the cellulose separates and removing the mixture of ether and sulfuric acid.

4. The method of forming simpler compounds from cellulose comprising treating cellulose with concentrated sulfuric acid, adding ether to the reaction product whereby the conversion product of the cellulose separates, removing the mixture of ether and sulfuric acid and separating the ether from the sulfuric acid.

5. The method of forming simpler compounds from cellulose comprising treating cellulose with concentrated sulfuric acid, adding ether to the reaction product whereby the conversion product of the cellulose separates, removing the mixture of ether and sulfuric acid, separating the ether from the sulfuric acid and employing the separated ether and sulfuric acid for the treatment of a further quantity of cellulose.

6. The method of forming simpler compounds from cellulose comprising treating cellulose with a mixture of sulphuric acid and ether and removing the ether, containing sulphuric acid in solution, after the cellulose becomes converted.

In testimony whereof, I have hereunto subscribed my name.

GEORGE W. MILES.